US008695634B2

(12) United States Patent
Yashima et al.

(10) Patent No.: US 8,695,634 B2
(45) Date of Patent: Apr. 15, 2014

(54) SLIDING PART, MECHANICAL SEAL, FAUCET VALVE, AND ROLLING SUPPORT DEVICE EACH INCLUDING THE SLIDING PART

(75) Inventors: Mieko Yashima, Kirishima (JP); Yusaku Ishimine, Kirishima (JP)

(73) Assignee: Kyocera Corporation, Kyoto (JP)

( * ) Notice: Subject to any disclaimer, the term of this patent is extended or adjusted under 35 U.S.C. 154(b) by 465 days.

(21) Appl. No.: 13/142,252

(22) PCT Filed: Nov. 27, 2009

(86) PCT No.: PCT/JP2009/070016
§ 371 (c)(1),
(2), (4) Date: Jun. 24, 2011

(87) PCT Pub. No.: WO2010/073873
PCT Pub. Date: Jul. 1, 2010

(65) Prior Publication Data
US 2011/0253924 A1 Oct. 20, 2011

(30) Foreign Application Priority Data

Dec. 25, 2008 (JP) ................................ 2008-329126

(51) Int. Cl.
*F16K 25/00* (2006.01)
(52) U.S. Cl.
USPC ...... 137/625.17; 251/214; 251/366; 251/368; 277/539; 384/42
(58) Field of Classification Search
USPC ........ 251/368, 366, 214; 137/625.17, 625.41; 384/42; 277/539
See application file for complete search history.

(56) References Cited

U.S. PATENT DOCUMENTS 3,683,965 A * 8/1972 McClure et al. .............. 251/368
4,856,758 A * 8/1989 Knapp ...................... 137/625.41
4,932,438 A * 6/1990 Kitamura et al. ........ 137/625.41
(Continued)

FOREIGN PATENT DOCUMENTS

JP 05-148058 6/1993
JP 2002265271 A 9/2002
(Continued)

OTHER PUBLICATIONS

Japanese language office action dated Nov. 26, 2012 and its English translation-in-part issued in corresponding Japanese application 2010543988 cites the foreign patent document above.

*Primary Examiner* — John Bastianelli
(74) *Attorney, Agent, or Firm* — DLA Piper LLP (US)

(57) ABSTRACT

Provided are a sliding component, such as a mechanical seal ring, which is capable of maintaining superior sliding characteristics even in the long-term continuous use thereof, as well as a mechanical seal, a faucet valve, and a rolling support device, each of which includes the sliding component. The sliding component includes a stationary member, and a movable member contactedly sliding on the stationary member. The stationary member and the movable member are respectively composed of a silicon carbide sintered body containing graphite. The content of the graphite in one of the stationary member and the movable member is at least 4% by mass greater than in the other. Thus, the sliding component includes the stationary member and the movable member which are a combination of those having different contents of graphite. Owing to a high lubricating effect, the superior sliding characteristics can be maintained, permitting a long-term continuous sliding.

10 Claims, 6 Drawing Sheets

(56) References Cited

U.S. PATENT DOCUMENTS

| | | | |
|---|---|---|---|
| 5,007,615 A * | 4/1991 | Kernion et al. | 251/368 |
| 5,052,363 A * | 10/1991 | Stiles | 251/368 |
| 5,100,565 A * | 3/1992 | Fujiwara et al. | 251/368 |
| 5,755,261 A * | 5/1998 | Fukuzawa et al. | 251/368 |
| 5,763,072 A * | 6/1998 | Kato et al. | 428/336 |
| 5,829,735 A * | 11/1998 | Ikeda | 137/625.17 |
| 6,089,843 A * | 7/2000 | Kondoh | 251/368 |
| 6,904,935 B2 * | 6/2005 | Welty et al. | 137/625.17 |
| 7,445,018 B1 * | 11/2008 | Morando | 251/326 |
| 2003/0195122 A1 | 10/2003 | Demendi et al. | 508/107 |
| 2006/0038353 A1 | 2/2006 | Murakami et al. | 277/399 |

FOREIGN PATENT DOCUMENTS

| | | |
|---|---|---|
| JP | 2005-523225 | 8/2005 |
| JP | 2006-057725 | 3/2006 |
| JP | 2007-119338 | 5/2007 |

* cited by examiner (a)

(b)

(a)

(b)

(a)

(b)

SLIDING PART, MECHANICAL SEAL, FAUCET VALVE, AND ROLLING SUPPORT DEVICE EACH INCLUDING THE SLIDING PART

CROSS-REFERENCE TO THE RELATED APPLICATIONS

The present application is a national stage of international application No. PCT/JP2009/070016, filed on Nov. 27, 2009, and claims the benefit of priority under 35 USC 119 to Japanese Patent Application No. 2008-329126, filed on Dec. 25, 2008, the entire contents of which are incorporated herein by reference.

TECHNICAL FIELD

The present invention relates to a sliding component and, in particular, a mechanical seal ring, and a mechanical seal including the mechanical seal ring used for mechanical seals of holding tank pumps and automobile cooling water pumps. The present invention also relates to a faucet valve including the sliding component, such as water faucet valves, hot water faucet valves, and hot and cold water mixing faucet valves, and to a rolling support device such as roller bearings, ball screws, and linear guides.

BACKGROUND ART

A sliding component using a ceramic sintered body has been applied by taking advantage of the wear resistance thereof, for example, to a mechanical seal that is one of shaft sealing devices for the purpose of completely sealing fluid in rotating parts of various kinds of machines. The mechanical seal includes a mechanical seal ring.

The mechanical seal ring is made up of a rotary ring that slidingly contacts the rotating parts of the various types of machines, and is movable in the axial direction in accordance with the wear of a sliding surface, and a stationary ring being immovable. The mechanical seal ring functions to restrict the fluid leakage at an end face substantially vertical to a relatively rotating shaft.

As the mechanical seal with the mechanical seal ring, patent document 1 proposed the mechanical seal device to abuttingly seal a first sliding member for sealing and a second sliding member for sealing. The first sliding member for sealing uses silicon carbide as the base material, and contains carbon. The second sliding member for sealing contains silicon carbide as the main ingredient, and has independently dispersed pores having a pore diameter of 5 to 200 μm.

FIG. 6 is a sectional view of the mechanical seal device according to an embodiment proposed in the patent document 1. The mechanical seal device 50 shown in FIG. 6 is disposed between a seal housing 51 and a rotary shaft 52. The mechanical seal device 50 is constructed as follows. That is, a seal ring 53 as a fixed-side ring, and a mating ring 54 as a rotation-side ring are assembled through their respective sliding surfaces 53a and 54a, and these two sliding surfaces function as a sealing surface and a rotating contact surface.

The seal ring 53 is attached to a seal housing 51 through a cartridge 55, and the mating ring 54 is attached to the rotary shaft 52 through a support part 56.

The seal ring 53 as the fixed-side ring is pressed by the elastic force of a spring 58 through a bellows 57 so as to be press-contacted against the sliding surface 54a of the mating ring 54 through a sliding surface 53a. The bellows 57 is fixed by a first attachment portion 60 and a second attachment portion 61. The spring 58 is held between the first attachment portion 60 and the cartridge 55.

On the other hand, the mating ring 54 as the rotation-side ring is press-contacted against the sliding surface 53a of the seal ring 53 through the sliding surface 54a, and is attached to the support part 56 through a gasket 62, thereby being rotatable together with the rotary shaft 52.

Thus, the mechanical seal device is proposed in which the seal ring 53 is the sliding member for sealing using silicon carbide as the base material, and containing carbon; and the mating ring 54 is the sliding member for sealing containing silicon carbide as the main ingredient, and having the independently dispersed pores having the pore diameter of 5 to 200 μm.

PRIOR ART DOCUMENTS

Patent Document

Patent Document 1: Japanese Unexamined Patent Publication No. 2006-57725

SUMMARY OF THE INVENTION

Problems to be Solved by the Invention

The mechanical seal device proposed in the patent document 1 has excellent durability and dry sliding resistance, and prevents burn-on and wear of the sliding members for sealing, and effectively suppresses occurrence of noise during sliding. However, there is the desire for a mechanical seal device capable of maintaining sliding characteristics over a longer term. Further improvement of the sliding characteristics is needed in the sliding component.

The present invention has been made for solving the above problem, and an object thereof is to provide a sliding component, such as a mechanical seal ring, which is capable of maintaining sliding characteristics even in a long-term continuous use, as well as a mechanical seal, a faucet valve, and a rolling support device, each of which includes the sliding component.

Means for Solving the Problems

The sliding component of the present invention includes a stationary member and a movable member contactedly sliding on the stationary member. The stationary member and the movable member are respectively composed of a silicon carbide sintered body containing graphite. The content of the graphite in one of the stationary member and the movable member is at least 4% by mass greater than in the other.

The mechanical seal ring of the present invention includes the sliding component of the present invention.

The mechanical seal of the present invention includes the mechanical seal ring of the present invention.

The faucet valve of the present invention includes the sliding component of the present invention.

The rolling support device of the present invention includes the sliding component of the present invention.

Effect of the Invention

The sliding component of the present invention includes the stationary member and the movable member contactedly sliding on the stationary member. The stationary member and the movable member are respectively composed of a silicon carbide sintered body containing graphite. The content of the graphite in one of the stationary member and the movable member is at least 4% by mass greater than in the other. Accordingly, one having the high content of graphite can impart high lubricating effect to the sliding surfaces where the stationary member and the movable member come into contact with each other. On the other hand, one having a low content of graphite has a higher hardness than the one having the high content of graphite, and therefore can suppress the amount of wear in the sliding surfaces in the long-term continuous use. The sliding component consists of the stationary member and the movable member which are a combination of those having different contents of graphite. Thereby, owing to the high lubricating effect, superior sliding characteristics can be maintained, permitting the long-term continuous sliding. Additionally, there is the difference in hardness between the stationary member and the movable member. Therefore, after the long-term continuous sliding, only the one having the high content of graphite may be replaced, thereby decreasing the replacement frequency of the one having the low content of graphite.

The mechanical seal of the present invention includes the mechanical seal ring comprised of the sliding component of the present invention. Hence, the excellent sliding characteristics of the sliding component provide the long-term use. This facilitates maintenance and management, and the replacement frequency of the mechanical seal ring can be decreased, thereby reducing costs and improving the rate of operation of the pump or the like using the mechanical seal.

The faucet valve and the rolling support device of the present invention include the sliding component of the present invention. Therefore, both can maintain the superior sliding characteristics even in the long-term use thereof, thereby decreasing the replacement frequency of the sliding component. Additionally, the inclusion of the sliding component having excellent sliding characteristics and a long life provides highly reliable faucet valve and rolling support device.

BRIEF EXPLANATION OF THE DRAWINGS

FIG. 1(a) is a photomicrograph showing the sliding surface of the stationary member; and FIG. 1(b) shows a photomicrograph showing the sliding surface of the movable member;

FIG. 3(a) is a partial sectional view thereof; and FIG. 3(b) is a perspective view of the mechanical seal ring shown in FIG. 3(a);

FIG. 4(a) is a perspective view showing the state where a fluid passage is opened; and FIG. 4(b) is a perspective view showing the state where the fluid passage is closed;

FIG. 5(a) is a sectional view thereof; and FIG. 5(b) is a perspective view showing a retainer of the roller bearing shown in FIG. 5(a)

EMBODIMENTS FOR CARRYING OUT THE INVENTION

Examples of the embodiments according to the present invention are described in detail with reference to the drawings.

Figure 1:
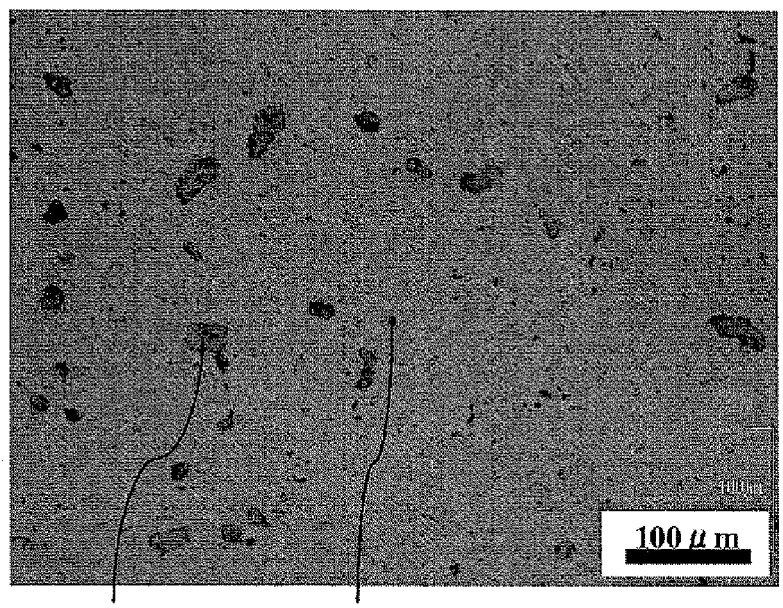
FIG. 1 shows one example of embodiments of the sliding component of the present invention.
Figure 1:
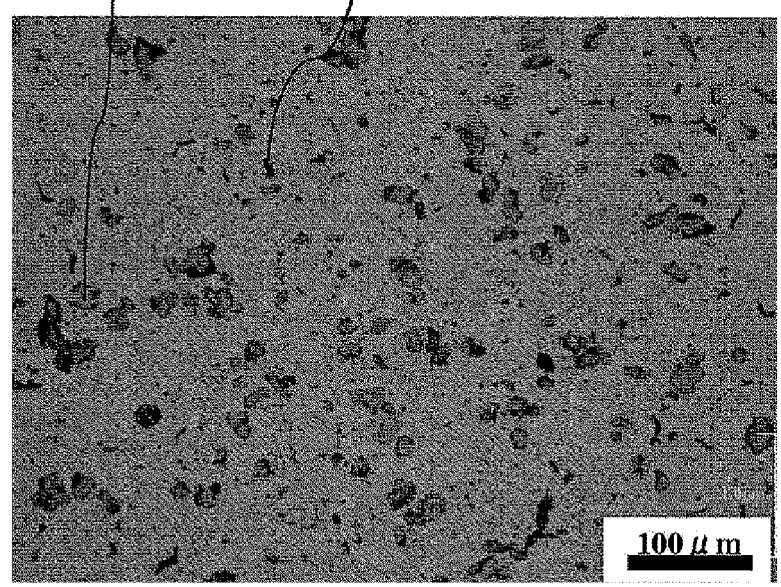

FIG. 1 shows an example of the embodiments of the sliding component of the present invention. Specifically, FIG. 1(a) is the photomicrograph showing the sliding surface of the stationary member, and FIG. 1(b) is the photomicrograph showing the sliding surface of the movable member. The sliding component of the present invention includes the stationary member, and the movable member contactedly sliding on the stationary member. The stationary member and the movable member are respectively composed of a silicon carbide sintered body containing graphite. As shown in FIG. 1, the graphite 1 and pores 2 exist in the contactedly sliding surfaces (hereinafter referred to as sliding surfaces). The graphite 1 has high lubricating effect and therefore improves the sliding characteristics of the sliding component. The pores 2 function to maintain the sliding characteristics over the long term by holding a lubrication fluid.

Here, the silicon carbide sintered body is a sintered body whose main ingredient is silicon carbide. The main ingredient means the ingredient occupying 50% by mass or more with respect to 100% by mass of all ingredients constituting the silicon carbide sintered body. Not only the sliding surfaces in their initial state, but also surfaces appearing newly due to wear after starting sliding are called sliding surfaces.

In the sliding component of the present invention, it is important that the content of graphite in one of the stationary member and the movable member is at least 4% by mass greater than in the other. One having a high content of graphite can impart a high lubricating effect to the sliding surfaces where the stationary member and the movable member come into contact with each other. On the other hand, one having a low content of graphite has a higher hardness than the one having the high content of graphite, and therefore can suppress the amount of wear in the sliding surfaces in the long-term continuous use. The sliding component consists of the stationary member and the movable member which are a combination of those having different contents of graphite. Thereby, owing to the high lubricating effect, superior sliding characteristics can be maintained, permitting the long-term continuous sliding. Additionally, there is the difference in hardness between the stationary member and the movable member. Therefore, after the long-term continuous sliding, only the one having the high content of graphite may be replaced, thereby decreasing the replacement frequency of the one having the low content of graphite.

Hence, in the stationary member and the movable member of the present invention, it is preferred to increase the content of graphite in the member that is less likely to cause lowering of the rate of operation, and can be replaced easily.

It is also preferred that the content of graphite in the silicon carbide sintered body be less than 10% by mass. By controlling the content thereof within this range, the sliding component has excellent sliding characteristics and a long life.

The sealing properties of the sliding component differ depending on the mean crystal grain diameter of the graphite in the silicon carbide sintered body. Therefore in the sliding component of the present invention, the mean crystal grain diameter of the graphite in the silicon carbide sintered body is preferably not less than 4 μm nor more than 43 μm. Under the presence of graphite having the mean crystal grain diameter in this range, the grain growth of silicon carbide crystal grains during the sintering process is facilitated and densified, thereby obtaining high sealing properties. More preferably, the mean crystal grain diameter of the graphite in the silicon carbide sintered body is not less than 12 μm nor more than 30 μm.

The graphite may be identified by, for example, X-ray diffraction method using CuKα ray. The content of graphite may be measured by carbon analysis method.

The mean crystal grain diameter of graphite can be found in the following manner. That is, the images of four locations on the sliding surface, each measuring area being set to 2471 μm×1853 μm, are photographed by an optical microscope at 50 times magnification. The obtained images are analyzed using image analysis software.

Figure 2:
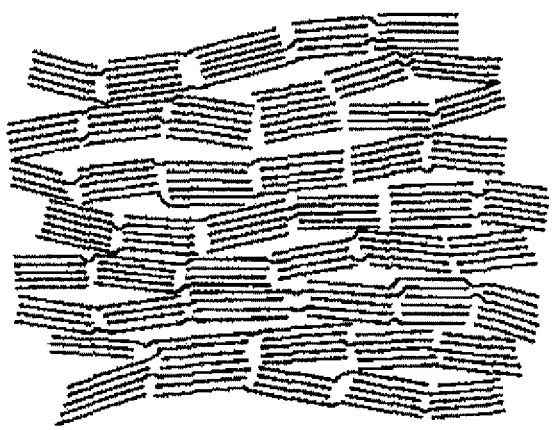
FIG. 2 is a schematic diagram showing one example of the crystal structure of graphite.

FIG. 2 is the schematic diagram showing one example of the crystal structure of graphite. When in the crystal structure of graphite, the carbon layer surface thereof shows orderly orientation, as shown in FIG. 2, the pores within the graphite crystal grains are decreased, thereby enhancing the compressive strength of the silicon carbide sintered body.

In the sliding component of the present invention, the half band width of the diffraction peak from the (002) orientation of graphite, obtained by the measurement using the X-ray diffraction method, is preferably 0.3° or below (excluding 0°). By controlling the half band width within this range, the graphite crystal structure becomes dense as shown in FIG. 2, thereby enhancing mechanical characteristics, including compressive strength, such as bending strength, static modulus of elasticity, and hardness. Particularly, the graphite crystal structure is preferably the crystal structure of hexagonal system, called 2H graphite.

The sliding characteristics and sealing properties of the sliding component differ depending on the open porosity on the individual sliding surfaces of the stationary member and the movable member. Therefore, in the sliding component of the present invention, the open porosity in the individual sliding surfaces of the stationary member and the movable member is preferably not less than 0.2% nor more than 4%. By controlling the open porosity within this range, the sliding characteristics can be enhanced by the high retention performance of the lubricating fluid, while maintaining the sealing properties for a long term. The open porosity can be found according to JIS R 1634: 1998, and is more preferably not less than 0.3% nor more than 3%.

The thermal shock resistance of the sliding component differs depending on the thermal conductivity and four-point bending strength of the silicon carbide sintered body. The silicon carbide sintered body having both high thermal conductivity and high four-point bending strength can increase coefficients of thermal shock resistances R and R' expressed by the following equations (1) and (2), respectively, thereby enhancing the thermal shock resistance of the sliding component.

$$R = \sigma c \cdot (1-v)/(E \cdot \alpha) \quad (1)$$

wherein σc is four-point bending strength (Pa); v is Poisson's ratio; E is elastic modulus of elasticity (Pa); α is coefficient of thermal expansion (×10⁻⁶/K) at 40 to 400° C.

$$R' = R \cdot k \quad (2)$$

wherein k is thermal conductivity (W/(m·k))

Here, the coefficient of thermal shock resistance R is the coefficient that becomes an index of thermal shock resistance when subjected to rapid cooling after heating. The coefficient of thermal shock resistance R' is the coefficient that becomes an index of thermal shock resistance when subjected to relatively moderate cooling after heating.

The silicon carbide sintered body preferably has a thermal conductivity of 157 W/(m·K) or more, and a four-point bending strength of 282 MPa or more. When the thermal conductivity and the four-point bending strength fall within these two ranges, respectively, even under a severe situation where the silicon carbide sintered body is subjected to thermal shock due to high temperature frictional heat momentarily generated during sliding, the silicon carbide sintered body has enhanced strength and is capable of momentarily releasing the frictional heat, thus being less susceptible to cracks. Consequently, the long-term reliability thereof is improved.

More preferably, the silicon carbide sintered body has a thermal conductivity of 175 W/(m·K) or more, and a four-point bending strength of 330 MPa or more.

The thermal conductivity and four-point bending strength of the silicon carbide sintered body may be measured according to JIS R 1611: 1997 and JIS R 1601: 2008 (ISO 14704: 2000 (MOD)), respectively.

From the viewpoint of enhancing thermal shock resistance, the silicon carbide sintered body preferably has higher rigidity, and the static modulus of elasticity thereof, which is one of indexes indicating rigidity, is preferably 392 GPa or more. The static modulus of elasticity may be measured according to ultrasonic pulse method based on JIS R 1602: 1995.

In the sliding component of the present invention, a larger number of pores having a circular opening are preferably dotted in the sliding surface having a low content of the graphite in one of the stationary member and the movable member than in the sliding surface having the high content of the graphite. That is, when a larger number of pores having the circular opening are preferably dotted in the sliding surface having the low content of the graphite than in the sliding surface having the high content of the graphite, the lubricating fluid is likely to be retained in the pores of the sliding surface having the low content of graphite, and the lubricating fluid is gradually supplied between the sliding surfaces. Therefore, the sliding characteristics can be maintained over the long term, and the sliding surfaces are less susceptible to wear, thus further decreasing the replacement frequency of the member having the low content of graphite.

The pores having the circular opening are defined as follows. That is, four regions are selected from the vicinity of the center of the sliding surface, and each measuring area is set to 2471 μm×1853 μm. With image analysis software "A-ZO KUN" (registered trademark, available from Asahi Kasei Engineering Corporation), the images obtained by photographing these four regions are analyzed in terms of circularity 2 defined by the image analysis software, and the pores whose circularity 2 is 0.8 or more are defined as the pore having the circular opening. Hereat, the circularity 2 is the degree of circularity, and is expressed in the range of 0.0 to 1.0. As it approaches 1, the pore appears more like a circle. The circularity 2 is a value found by the following equation:

$$4 \times \pi \text{area}/(\text{perimeter } 2)^2$$

Figure 3:
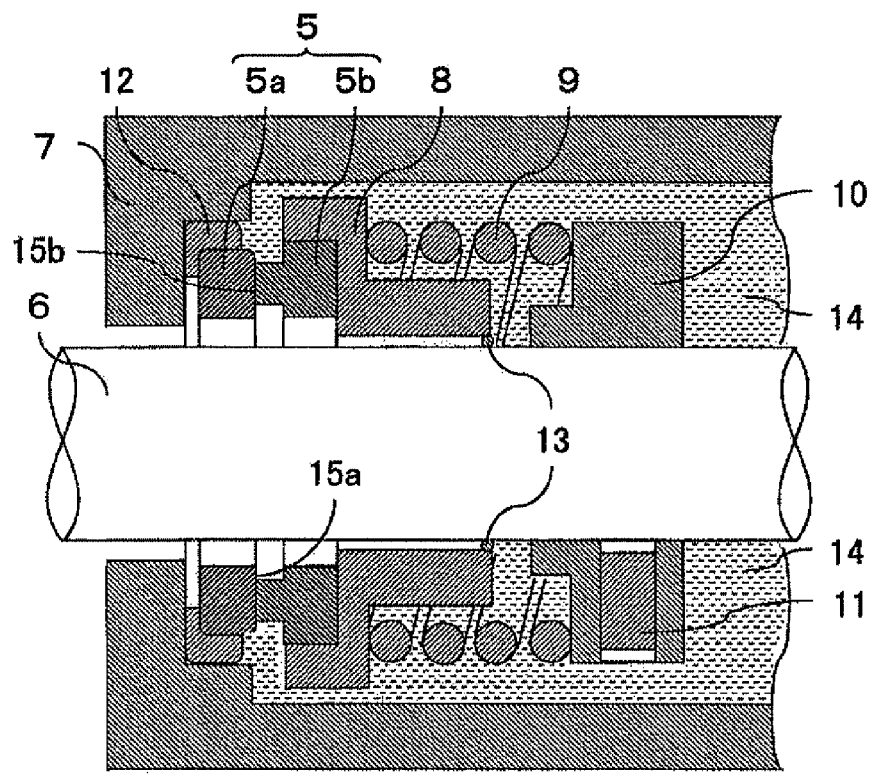
FIG. 3 shows an example of embodiments of the mechanical seal of the present invention.
Figure 3:
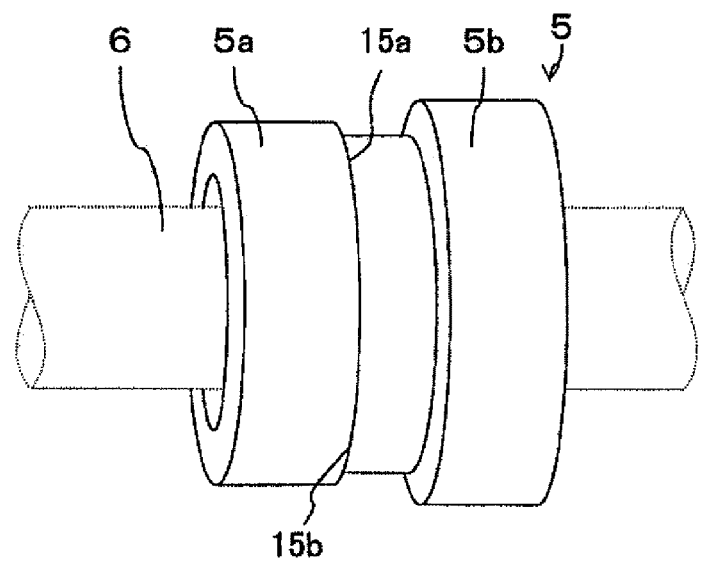

FIG. 3(a) is the partial sectional view showing one example of the mechanical seal in which the sliding component of the present embodiment shown in FIG. 1 is applied to the mechanical seal ring. FIG. 3(b) is the perspective view of the mechanical seal ring of the present embodiment. This mechanical seal is the device including the mechanical seal ring 5 for imparting sealing function by allowing the sliding surface 15b of the movable member 5b, which is an annular body having a projected portion, to slide on the sliding surface 15a of the stationary member 5a that is an annular body.

The mechanical seal ring 5 is attached between the rotary shaft 6 for transmitting the driving force generated by a driving mechanism (not shown), and a casing 7 for rotatably bearing the rotary shaft 6. The mechanical seal ring 5 is installed so that the sliding surfaces 15a and 15b of the stationary member 5a and the movable member 5b form a vertical surface with respective to the rotary shaft 6.

The movable member 5b is bufferingy supported by a packing 8. A coil spring 9 is installed so as to wind the rotary shaft 6 on the side of the packing 8 opposite the movable member 5b. The packing 8 is pressed by the resilient force of the coil spring 9 (the preset force of the coil spring 9), thereby causing the sliding surface 15b of the movable member 5b to slide under pressure from the sliding surface 15a of the stationary member 5a. On the side opposite the side on which the coil spring 9 presses the packing 8, a collar 10 is fixed to the rotary shaft 6 by a set screw 11, and is installed as the stopper of the coil spring 9.

On the other hand, the stationary member 5a contacted with the sliding surface 15b of the movable member 5b through the sliding surface 15a is supported by a buffer rubber 12. The buffer rubber 12 is attached to the inside of the casing 7 serving as the outer frame of the mechanical seal, and is adapted to support the stationary member 5a. The collar 10 is rotated upon rotation of the rotary shaft 6. The packing 8 pressed by the resilient force of the coil spring 9, and the sliding surface 15b of the rotary member 5b supported by the packing 8 are rotated while being pressed, thereby imparting sealing function between the sliding surface 15b and the sliding surface 15a of the stationary member 5a. When this mechanical seal is attached to a fluid equipment (not shown), the attachment thereof is carried out so that the fluid equipment is arranged on the extension on the side of collar 10 with respect to the mechanical seal ring 5.

Hereat, the fluid enters the inside surrounded by the casing 7 of the mechanical seal, however, the sealing function by an O-ring 13 disposed between the packing 8 and the rotary shaft 6, and the sealing function of the sliding surfaces 15a and 15b of the mechanical seal ring 5 suppress the fluid from being leaked outward than the mechanical seal. The fluid sealed by the mechanical seal is referred to as sealed fluid 14, a part of which enters between the sliding surfaces 15a and 15b of the mechanical seal ring 5, and functions as a lubricating fluid. On the other hand, the movable member 5b is bufferingly supported by the packing 8. The buffer rubber 12 and the packing 8 have also a function of absorbing vibrations generated by the rotation of the rotary shaft 6. In the mechanical seal shown in FIG. 3, the stationary member 5a is the planar annular body, and the movable member 5b is the annular body having the projected portion. Reversely, the stationary member 5a may be the annular body having the projected portion, and the movable member 5b may be the planar annular body.

In the mechanical seal of the present invention, when the movable member 5b starts sliding, firstly, a dynamic pressure due to the air flow occurs on the sliding surfaces 15a and 15b. Then, in the opening, a negative pressure lower than the dynamic pressure is exerted on the lubricating fluid retained in the open pores. By the negative pressure occurred on the opening, the lubricating fluid retained in the open pores can be adequately supplied to the sliding surfaces 15a and 15b.

The mechanical seal ring 5 consists of the stationary member 5a and the movable member 5b which slide by allowing their respective sliding surfaces 15a and 15b to come into contact with each other through the lubricating fluid. In the embodiment of the present invention, the stationary member 5a and the movable member 5b are composed of the silicon carbide sintered body containing graphite. The content of graphite in one of the stationary member and the movable member is at least 4% by mass greater than in the other. In the mechanical seal shown in FIG. 3, when the movable member 5b has an easily replaceable structure, the content of graphite of the silicon carbide sintered body in the movable member 5b is preferably at least 4% by mass greater than in the stationary member 5a. The use of the mechanical seal ring 5, which is the sliding component obtained by this combination, provides both excellent sealing properties and excellent retention performance of the lubricating fluid, thereby enhancing the long-term reliability of the mechanical seal.

Figure 4:
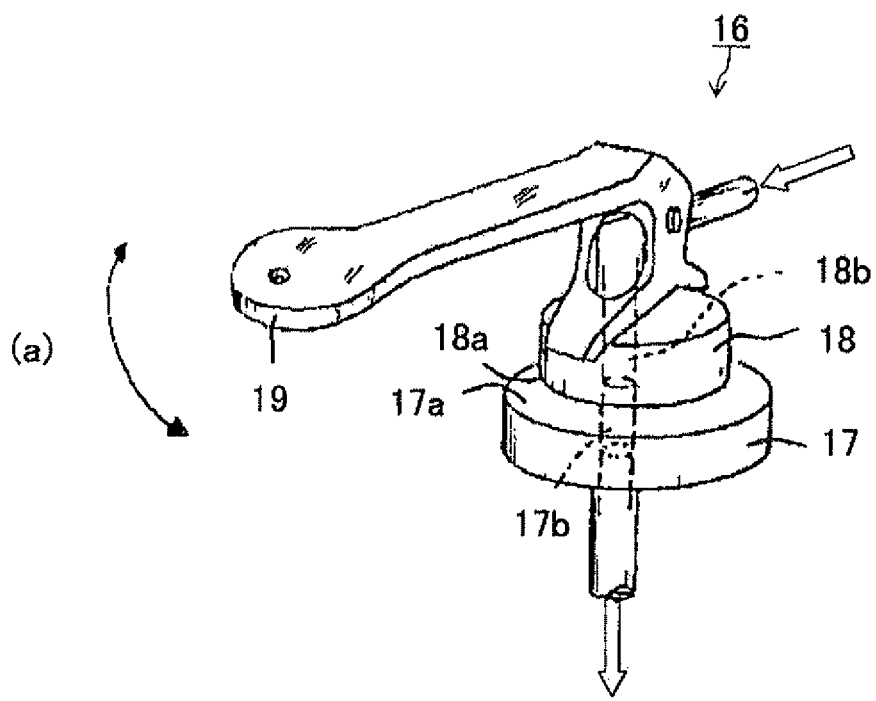
FIG. 4 shows an example of embodiments of the faucet valve of the present invention.
Figure 4:
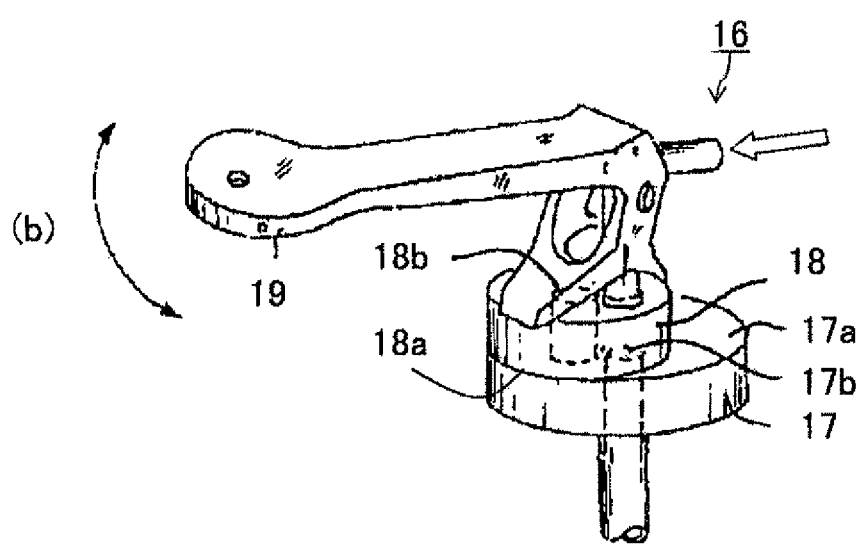

FIG. 4 shows one example of embodiments of the faucet valve of the present invention. Specifically, FIG. 4(a) is the perspective view showing the state where the fluid passage is opened, and FIG. 4(b) is the perspective view showing the state where the fluid passage is closed.

The faucet valve 16 includes a substrate-like stationary valve body 17 and a rotary valve body 18 which allow their respective sliding surfaces 17a and 18a to slide by bringing them into contact with each other through the lubricating fluid. The stationary valve body 17 is fixed to a resin case (not shown), and the movable valve body 18 is movable on the stationary valve body 17 in the inside of the resin case. Fluid passages 17b and 18b are respectively formed in the stationary valve body 17 and the movable valve body 18 in their thickness direction. These two fluid passages 17b and 18b are connected to each other on the sliding surfaces 17a and 18a. A lever 19 is also fixed to the movable valve body 18, and the movable valve body 18 is moved by moving the lever 19 vertically or in the rotational direction thereof. In this faucet valve, the stationary valve body 17 corresponds to the stationary member, and the movable valve body 18 corresponds to the movable member.

As shown in FIG. 4(a), in the state where the fluid passages 17b and 18b are opened, the fluid, such as water or hot water, flows from the blank arrow direction to the fluid passages 17b and 18b in this order, and the fluid is ejected from a faucet (not shown) connected to the faucet valve 16. Hereat, the fluid entered between the sliding surfaces 17a and 18a becomes a lubricating fluid, together with silicone grease previously applied to either of the sliding surfaces 17a and 18a, and the lubricating fluid functions to maintain sliding characteristics.

On the other hand, as shown in FIG. 4(b), the gap between the fluid passages 17b and 18b can be closed by moving up or down the movable valve body 18 through the lever 19, thereby stopping the fluid ejected from the faucet.

By moving the movable valve body 18 in the rotational direction thereof, the area of the end face where the fluid passages 17b and 18b are connected to each other is adjusted to thereby adjust the flow rate of the fluid ejected from the faucet.

The faucet valve 16 of the present embodiment uses the sliding component of the present embodiment having both excellent sealing properties and excellent retention performance of the lubricating fluid, thus enhancing the long-term reliability thereof.

Figure 5:
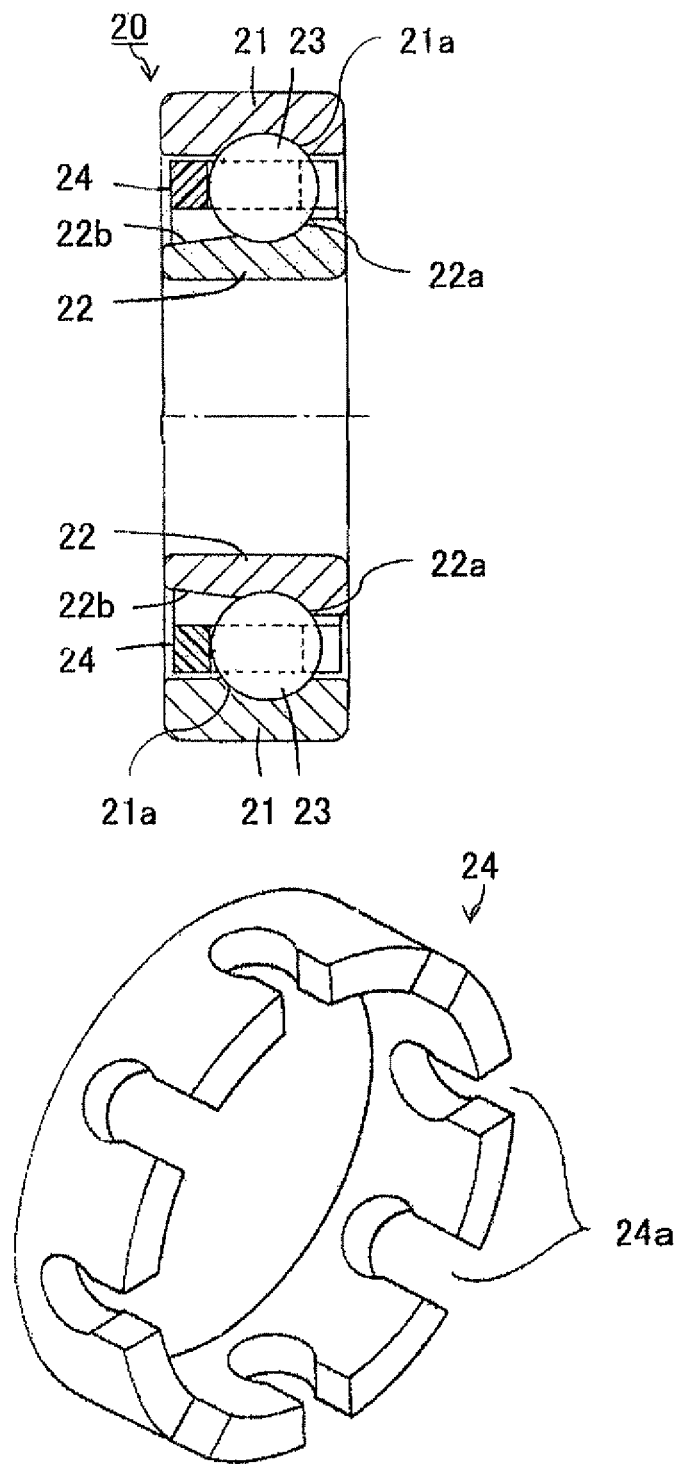
FIG. 5 shows a roller bearing as an example of embodiments of the rolling support device of the present invention.
Figure 6:
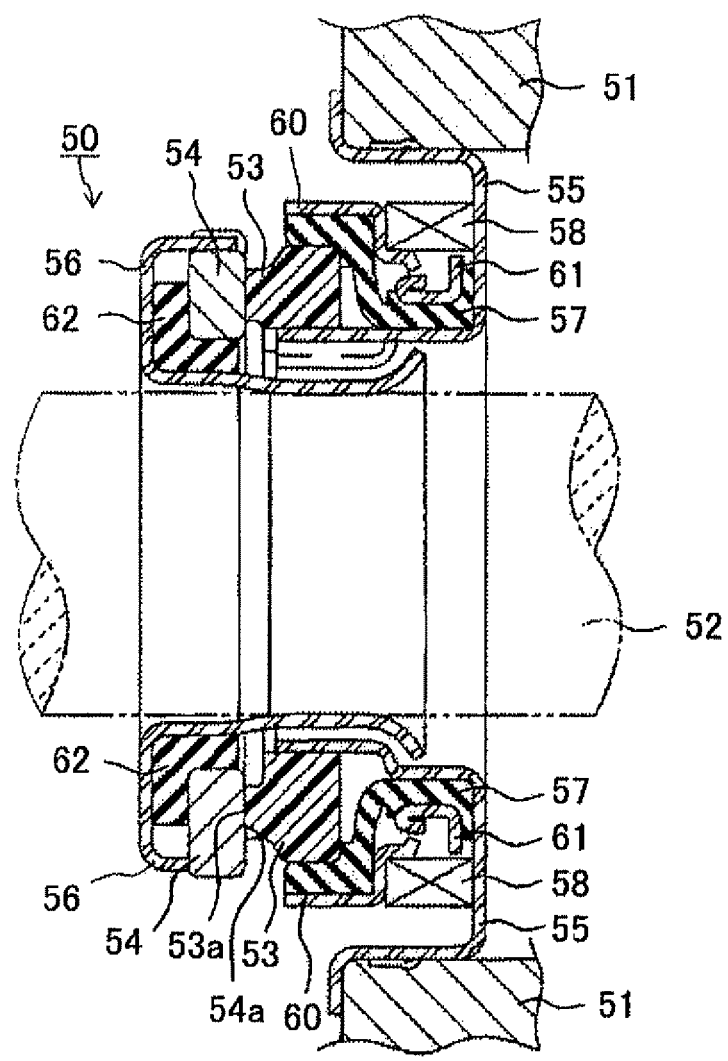
FIG. 6 is a sectional view of a conventional mechanical seal device.

FIG. 5 shows the roller bearing as an example of embodiments of the rolling support device of the present invention. Specifically, FIG. 5(a) is the sectional view thereof, and FIG. 5(b) is the perspective view showing the retainer of the roller bearing shown in FIG. 5(a).

The roller bearing 20 shown as the example in FIG. 5(a) includes a first member (outer ring) 21 and a second member (inner ring) 22 which respectively include oppositely arranged raceway surfaces 21a and 22a, and a plurality of rolling elements 23 rollably disposed between the raceway surfaces 21a and 22a of the two members 21 and 22. The rolling of the rolling elements 23 causes one of the first member (outer ring) 21 and the second member (inner ring) 22 to move relative to the other.

A counterbore 22b is inclininingly formed from the raceway surface 22a of the second member (inner ring) 22 on one side of the rolling elements 23 on the raceway surface of the second member (inner ring) 22. The counterbore 22b facilitates attachment of the rolling elements 23 to between the first member (outer ring) 21 and the second member (inner ring) 22.

The retainer 24 shown in FIG. 5(b) is an annular body, and pockets 24a arranged at equal intervals in the circumferential direction thereof retain the rolling elements 23.

The rolling support device (roller bearing) 20 of the present invention as the example shown in FIG. 5 preferably includes the sliding component of the present invention. The first member (outer ring) 21 or the second member (inner ring) 22 and the rolling elements 23 correspond to the stationary member and the movable member, respectively.

By using the sliding component of the present invention, the superior sliding characteristics of the rolling support device can be maintained even in the long-term continuous use thereof, and the replacement frequency of the members is minimized, permitting the long-term continuous use.

In particular, the smooth raceway surfaces 21a and 22a contribute to the elongated lifetime of the rolling elements 23, and hence the arithmetic mean height thereof (Ra) is preferably 0.6 µm or less. On the other hand, the arithmetic mean height (Ra) of the surfaces of the rolling elements 23 is preferably 0.01 µm or less.

Preferably, the retainer 24 is composed mainly of polyether ether ketone (PEEK), polyamide-imide alloy (PAI), or thermoplastic polyimide (TPI), and contains a fiber-like filler, such as aluminum borate whisker, potassium titanate whisker, barium titanate whisker, titanium oxide whisker, carbon whisker, graphite whisker, silicon carbide whisker, silicon nitride whisker, or aluminum oxide whisker. The incorporation of the above fiber-like filler enhances the mechanical strength, wear resistance and dimensional stability of the retainer 24.

Next, a method of manufacturing the sliding component of the present invention is described.

To obtain the sliding component of the present invention, firstly, slurry is obtained by mixing together silicon carbide powder as the main ingredient, water, and a dispersing agent for dispersing the silicon carbide powder as needed, with a ball mill or a bead mill for 40 to 50 hours. Then, granules composed mainly of the silicon carbide are obtained by adding graphite powder, a dispersing agent for dispersing the graphite (hereinafter referred to as graphite dispersing agent), sintering additives composed of boron carbide powder and amorphous carbon powder or phenol resin, and a binder to the slurry, and by mixing together, followed by spray drying.

In order to allow a larger number of pores having the circular opening to be dotted in the sliding surface having a low content of graphite than in the sliding surface having a high content of graphite in one of the stationary member and the movable member, for example, suspension polymerized resin beads composed of at least one selected from silicone beads, styrene, and acrylic styrene copolymer may be previously added as a pore forming agent, together with the silicon carbide powder and water, to the member having the low content of graphite. Specifically, not less than 1% by mass nor more than 5% by mass of the suspension polymerized resin beads may be added to 100% by mass of the silicon carbide powder.

Hereat, in order to adjust so that the content of graphite in one of the stationary member and the movable member is at least 4% by mass greater than in the other, for example, when manufacturing the granules for forming the stationary member and the movable member, the graphite powder may be added so that the content of graphite in one of these two members is at least 4% by mass (more preferably at least 5% by mass) greater than in the other.

In order to adjust the content of graphite in the silicon carbide sintered body to less than 10% by mass, the total of the amount of addition of the graphite powder and a half of the amount of addition of the amorphous carbon powder as the sintering additives may be adjusted to less than 10% by mass with respect to 100% by mass of the silicon carbide powder.

In order to adjust the mean crystal grain diameter of the graphite in the silicon carbide sintered body to not less than 4 µm nor more than 43 µm, the graphite powder having an average grain diameter of not less than 8 µm nor more than 45 µm may be used.

The open porosity in the sliding surfaces where the stationary member and the movable member come into contact with each other is affected by the amount of addition of the amorphous carbon powder as the sintering additives. In order to adjust the open porosity thereof to not less than 0.2% nor more than 4%, the amount of addition of the amorphous carbon powder may be adjusted to not less than 0.3% by mass nor more than 1.0% by mass with respect to 100% by mass of the silicon carbide powder.

In order to obtain the silicon carbide sintered body having a thermal conductivity of 157 W/(m·k) or more, and a four-point bending strength of 282 MPa or more, the amorphous carbon powder may be adjusted to 1.0% by mass or less, and the graphite powder having an average grain diameter of not less than 8 µm nor more than 45 µm may be adjusted to not less than 3% by mass nor more than 7% by mass, with respect to 100% by mass of silicon carbide powder.

The homogeneous granules incorporating the graphite can be obtained by using the graphite dispersing agent. That is, the graphite dispersing agent adheres to the graphite powder that is hydrophobic, and allows the graphite powder to be wetted and penetrated into the slurry using water as solvent, and also functions to suppress aggregation of the graphite.

As the graphite dispersing agent, it is preferable to use, for example, carboxylate such as polycarboxylate, or anionic surfactant such as sodium sulfonate, sulfate ester, and sodium phosphate. The anionic surfactant adhered to the graphite powder allows the graphite powder to be easily wetted and penetrated into the slurry, and the reaggregation of the graphite powder is further suppressed by the charge repulsion of hydrophilic groups of the anionic surfactant. Therefore, the graphite powder can be sufficiently dispersed in the slurry without being aggregated.

The anionic surfactant can also disperse the pore forming agent. The anionic surfactant adheres to the pore forming agent, thereby allowing the pore forming agent to easily penetrate into the slurry. Also, the reaggregation of the pore forming agent is suppressed by the charge repulsion of hydrophilic groups of the anionic surfactant.

Meanwhile, carbon that is the ingredient of the sintering additives becomes free carbon and exists in the open pores in the sliding surfaces of the sliding component. During sliding of the sliding component, the free carbon easily flows out to the sliding surfaces that are in contact with each other, and is incorporated into the lubricating fluid. The incorporation of the free carbon into the lubricating fluid improves the sliding characteristics of the sliding component, thus being suitable for use in the mechanical seal ring as being the sliding component that is apt to cause strange noise and linking in the beginning of sliding, as well as the faucet valve and the rolling support device, each including the sliding component.

In addition to the foregoing ones described as the sintering additives, aluminum oxide powder and a rare earth oxide powder, such as yttrium oxide, may be used jointly.

Subsequently, the granules are charged into a predetermined forming die and press-formed from the thickness direction at a pressure suitably selected from the range of 49 to 147 MPa, thereby obtaining formed bodies that are the precursors of the stationary member and the movable member, respectively.

The obtained individual formed bodies are debinded in a nitrogen atmosphere at a temperature of 450 to 650° C. with a hold time of 2 to 10 hours, thereby obtaining debinded bodies. These debinded bodies are placed in a sintering furnace and held and sintered in the reduced pressure atmosphere of inert gas at a temperature of 1800 to 2100° C. with a hold time of 3 to 5 hours, thereby obtaining silicon carbide sintered bodies. Although no particular limitation is imposed on the inert gas, argon gas is suitably used because it is easy to purchase and handle.

The individual main surfaces of these obtained sintered bodies may be subjected to processing, such as grinding and polishing, as needed. For example, each main surface is made into the sliding surface by grinding with a double-head grinding machine or a surface grinding machine, and by lapping with a lapping machine made of alumina using diamond abrasive grains having an average grain diameter of 3 μm, followed by lapping with a lapping machine made of tin using diamond abrasive grains having an average grain diameter of 1 μm, so as to have an arithmetic mean height (Ra) of 0.98 μm or less. The reason for controlling the arithmetic mean height (Ra) to 0.98 μm or less is to maintain the sealing properties.

The arithmetic mean height Ra may be measured according to JIS B 0601: 2001 (ISO 4287: 1997). That is, the measuring length and the cut-off value are set at 5 mm and 0.8 mm, respectively. When the measurement is made by using a stylus surface roughness meter, a stylus having a stylus tip radius of 2 μm may be abutted against the sliding surface of the sliding component, and the scanning rate of the stylus may be set at 0.5 mm/sec.

By polishing the surfaces of the sintered bodies, the sliding component of the present invention can be obtained, in which one of the stationary member and the movable member is at least 4% by mass greater than in the other.

The foregoing manufacturing method provides inexpensively the sliding component used for the mechanical seal ring, faucet valve, and rolling support device, each of which has excellent retention performance of the lubricating fluid, and can maintain superior sealing properties even in the long-term continuous use.

Example 1

To silicon carbide powder as the main ingredient, a dispersing agent for dispersing water and the silicon carbide powder, and suspension-polymerized non-crosslinked resin beads composed of acrylic-styrene copolymer as the pore forming agent were added and charged into a ball mill, followed by mixing for 48 hours, thereby obtaining slurry. To the slurry, graphite powder, polycarboxylic acid sodium as the graphite dispersing agent, boron carbide powder and carbon black that is amorphous carbon powder as the sintering additives, and binder were added and mixed. This was then subjected to spray drying, thereby obtaining granules containing the silicon carbide as the main ingredient, and having the average grain diameter of 80 μm. Hereat, the polycarboxylic acid sodium was added to the graphite powder in order to also disperse the pore forming agent.

The total amount of addition of the boron carbide powder and the carbon black that is the amorphous carbon powder, the average grain diameter and the amount of addition of the graphite powder, and the amount of addition of the suspension-polymerized non-crosslinked resin beads composed of acrylic-styrene copolymer are as shown in Table 1.

Hereat, the average grain diameter of the graphite powder was found according to JIS R 1629: 1997. In each sample, the amount of addition of polycarboxylic acid sodium was 5% by mass with respect to 100% by mass of the graphite powder.

Next, the granules were charged into a forming die, and were press-formed from the thickness direction at a pressure of 98 MPa into a ring-shaped formed body. The obtained formed body was heated for 20 hours in a nitrogen atmosphere, and was held at 600° C. for 5 hours, followed by natural cooling, thereby performing debinder, and resulting in the debinded body.

Subsequently, the debinded body was held at 2030° C. for 5 hours in the reduced pressure atmosphere of argon gas, and was then sintered to obtain a ring-shaped silicon carbide sintered body. The main surface of the individual silicon carbide sintered body was ground by a surface grinding machine, and was then lapped by a lapping machine made of alumina using diamond abrasive grains having an average grain diameter of 3 μm. Finally, the surface thereof was lapped by a lapping machine made of tin using the diamond abrasive grains having an average grain diameter of 3 μm so as to have an arithmetic mean height (Ra) of 0.98 μm or less, thereby obtaining a sliding surface. Thus, the stationary member 5a having an outer diameter of 25 mm and an inner diameter of 16 mm. In the same manufacturing method, the movable member 5b having the projected portion and having an outer diameter of 25 mm and an inner diameter of 16 mm was obtained.

The content of graphite in the obtained individual samples was measured with a carbon analyzer (EMIA-511, manufactured by Horiba Ltd.).

The sliding surface of each sample was photographed by an optical microscope at 50 times magnification. The obtained image was analyzed to find the average crystal grain diameter of graphite in the sliding surface.

More specifically, the following technique was applied. That is, four regions were selected from the vicinity of the center of the sliding surface, and each measuring area was set to 2471 μm×1853 μm. The images obtained by photographing these four regions were subjected to grain analysis with the image analysis software "A-ZO KUN" (registered trademark, available from Asahi Kasei Engineering Corporation).

The open porosity in the sliding surface of each sample was found according to JIS R 1634: 1998.

The thermal conductivity and four-point bending strength thereof were measured according to JIS R 1611: 1997 and JIS R 1601: 2008 (ISO 14704: 2000 (MOD)), respectively. The static modulus of elasticity and Poisson's ratio were measured according to ultrasonic pulse method based on JIS R 1602: 1995. Samples having the shape based on these JIS definitions were manufactured separately.

The coefficient of thermal expansion at 40 to 400° C. was measured according to JIS R 1611: 1999 by separating manufacturing samples of the shape based on this JIS definition.

Table 2 shows the content of graphite, the mean crystal grain diameter of graphite and open porosity in the sliding surfaces, and the thermal conductivity, four-point bending strength, Poisson's ratio, static modulus of elasticity, and coefficient of thermal expansion of the silicon carbide sintered body, which were obtained by the foregoing techniques. Table 2 also shows the coefficient of thermal shock resistance R and the coefficient of thermal shock resistance R' defined by the foregoing equation (2).

The individual samples shown in Table 2 were used as the stationary member 5a and the movable member 5b. Table 3 shows combinations thereof.

The individual sliding surfaces 15a and 15b of the stationary members 5a and the movable members 5b shown in Table 3 were brought into contact with each other, and were slid under the following sliding conditions. After 150 hours from the start of sliding, the coefficient of friction and the wear depth indicating sliding characteristics were measured. These values were shown in Table 3. Further, after 1000 hours, 1500 hours, and 2000 hours after the start of sliding, the presence or absence of cracks in the sliding surfaces 15a and 15b were observed using the optical microscope at 50 times magnification. In Table 3, one in which no cracks was confirmed was expressed as "unconfirmed", and one in which cracks were confirmed was expressed as "confirmed".

<Sliding Conditions>
Relative speed: 8 m/sec
Surface pressure: 400 kPa
Lubricating fluid: water The relative speed is the rotation speed of the movable member 5b with respect to the stationary member 5a at a position which faces the outer peripheral side with reference to the center of the rotary shaft, and which is spaced therefrom by 11.25 mm (hereinafter referred to as position "P"). The surface pressure is the pressure per unit area of the movable member 5b with respect to the stationary member 5a. The surface pressure is found by dividing a pressing force F that is preset for bringing the stationary member 5a and the movable member 5b into contact with each other, by the area of the sliding surface 15b of the movable member 5b. Using an optical microscope provided with a gauge for measuring dimension, the area was calculated by measuring the outer diameter and the inner diameter of the projected portion of the movable member 5b with the gauge at 50 times magnification.

The coefficient of friction $\mu$ was found as follows. That is, a rotation torque T at the position P of the movable member 5b during sliding was measured by a torque meter. The rotation torque T was then divided by the pressing force F obtained by multiplying the area of the sliding surface 15b by a surface pressure and the distance from the center of the rotary shaft to the position P, namely, 11.25 mm. That is, the coefficient of friction $\mu$ was expressed as follows: $\mu=T/(11.25\times F)$, and the values thereof were shown in Table 2.

Regarding the wear depth, the thickness of one of the stationary member 5a and the movable member 5b which had a smaller content of graphite was measured by a dial gauge before the start of sliding and after 150 hours from the start of sliding. A thickness difference therebetween was regarded as the wear depth, and was shown in Table 3.

In Samples Nos. F and T, four regions were selected from the vicinity of the center of each of the sliding surfaces 15a and 15b, and each measuring area was set to 2471 µm×1853 µm. With the image analysis software "A-ZO KUN" (registered trademark, available from Asahi Kasei Engineering Corporation), the images obtained by photographing these four regions were analyzed in terms of circularity 2 defined by the image analysis software, and the pores whose circularity 2 was 0.8 or more were defined as the pore having the circular opening. Then, the number of the pores having the circular opening in these four regions of the sliding surface 15a and that of the sliding surface 15b were compared. The sample in which the sliding surface 15b had a larger number of the pores than the sliding surface 15a was expressed by $P_{15a}<P_{15b}$, and the sample in which the sliding surface 15a had a larger number of the pores than the sliding surface 15b was expressed by $P_{15}<P_{15b}$. Thus, the relationship of the number of the pores was shown in Table 3.

TABLE 1

| Sample No. | Carbon Black (Sintering Additive) Addition Amount [mass %] | Graphite (Lubricant) Average Grain Diameter [µm] | Graphite (Lubricant) Addition Amount [mass %] | Suspension-polymerized Non-crosslinked Resin Beads Composed of Acrylic-styrene Copolymer Addition Amount [mass %] |
|---|---|---|---|---|
| 1 | 1 | 5 | 3 | 0 |
| 2 | 1 | 48 | 3 | 0 |
| 3 | 1 | 8 | 3 | 0 |
| 4 | 1 | 45 | 3 | 0 |
| 5 | 1 | 19 | 1 | 0 |
| 6 | 1 | 21 | 2 | 0 |
| 7 | 1 | 25 | 3 | 0 |
| 8 | 1 | 21 | 4.9 | 0 |
| 9 | 1 | 30 | 5 | 0 |
| 10 | 1 | 30 | 7 | 0 |
| 11 | 0.25 | 29 | 9 | 0 |
| 12 | 1 | 24 | 9.5 | 0 |
| 13 | 0.2 | 22 | 10 | 0 |
| 14 | 1 | 30 | 7 | 1.2 |

TABLE 2

| | | Properties of Sintered Body | | | | | | | | |
|---|---|---|---|---|---|---|---|---|---|---|
| | | Graphite | | | | | | | Coefficient | Coefficient |
| Sample No. | Content [mass %] | Average Crystal Grain Diameter [µm] | Open Porosity [%] | Thermal Conductivity [W/(m·K)] | Four-Point Bending Strength [MPa] | Poisson's Ratio | Static Modulus of Elasticity [GPa] | Coefficient of Thermal Expansion [$\times 10^{-6}$/K] | of Thermal Shock Resistance R[K] | of Thermal Shock Resistance R'[W/m] |
| 1 | 3.5 | 3 | 2.2 | 144 | 261 | 0.16 | 289 | 3.7 | 205 | 29525 |
| 2 | 3.5 | 44 | 0.2 | 174 | 329 | 0.16 | 375 | 3.7 | 199 | 34657 |
| 3 | 3.5 | 4 | 0.3 | 178 | 330 | 0.16 | 380 | 3.7 | 197 | 35094 |
| 4 | 3.5 | 43 | 0.3 | 161 | 319 | 0.16 | 343 | 3.7 | 211 | 33994 |
| 5 | 1.5 | 15 | 0.2 | 183 | 378 | 0.16 | 390 | 3.7 | 220 | 40268 |
| 6 | 2.5 | 19 | 0.1 | 180 | 365 | 0.16 | 392 | 3.7 | 211 | 38050 |
| 7 | 3.5 | 19 | 0.2 | 179 | 352 | 0.16 | 361 | 3.7 | 221 | 39625 |
| 8 | 5.4 | 18 | 0.2 | 182 | 341 | 0.16 | 331 | 3.7 | 234 | 42567 |
| 9 | 5.5 | 22 | 0.3 | 175 | 330 | 0.16 | 325 | 3.7 | 231 | 40341 |
| 10 | 7.5 | 25 | 0.3 | 157 | 282 | 0.16 | 308 | 3.7 | 208 | 32634 |

TABLE 2-continued

| | | Properties of Sintered Body | | | | | | | Coefficient of Thermal Shock Resistance R[K] | Coefficient of Thermal Shock Resistance R'[W/m] |
|---|---|---|---|---|---|---|---|---|---|---|
| | Graphite | | | | | | | | | |
| Sample No. | Content [mass %] | Average Crystal Grain Diameter [μm] | Open Porosity [%] | Thermal Conductivity [W/(m·K)] | Four-Point Bending Strength [MPa] | Poisson's Ratio — | Static Modulus of Elasticity [GPa] | Coefficient of Thermal Expansion [×10⁻⁶/K] | | |
| 11 | 9.2 | 23 | 4 | 142 | 253 | 0.16 | 280 | 3.7 | 205 | 29129 |
| 12 | 10 | 22 | 1 | 139 | 250 | 0.16 | 268 | 3.7 | 212 | 29437 |
| 13 | 10.1 | 20 | 4.7 | 136 | 244 | 0.16 | 277 | 3.7 | 200 | 27197 |
| 14 | 7.5 | 25 | 3 | 155 | 280 | 0.16 | 305 | 3.7 | 208 | 32305 |

TABLE 3

| | | Movable | | | Evaluation of Sliding Properties | | |
|---|---|---|---|---|---|---|---|
| Sample No. | Stationary Member 5a Sample No. | Content of Graphite [mass %] | Member 5b Sample No. | Content of Graphite [mass %] | Difference of Content of Graphite [mass %] | Coefficient of Friction [μ] | Wear Depth *1 [μm] | Relationship of Number of Pores *2 |
| A✗ | 5 | 1.5 | 8 | 5.4 | 3.9 | 0.06 | 4 | — |
| B✗ | 6 | 2.5 | 7 | 3.5 | 1 | 0.08 | 8 | — |
| C✗ | 12 | 10 | 13 | 10.1 | 0.1 | 0.05 | 10 | — |
| D | 7 | 3.5 | 10 | 7.5 | 4 | 0.02 | 0.7 | — |
| E | 5 | 1.5 | 9 | 5.5 | 4 | 0.01 | 0.4 | — |
| F | 1 | 3.5 | 10 | 7.5 | 4 | 0.03 | 0.5 | $P_{15a} > P_{15b}$ |
| G | 2 | 3.5 | 10 | 7.5 | 4 | 0.02 | 2 | — |
| H | 3 | 3.5 | 10 | 7.5 | 4 | 0.01 | 0.8 | — |
| I | 4 | 3.5 | 10 | 7.5 | 4 | 0.02 | 0.6 | — |
| J | 7 | 3.5 | 11 | 9.2 | 5.7 | 0.01 | 0.3 | — |
| K | 9 | 5.5 | 13 | 10.1 | 4.6 | 0.01 | 3 | — |
| L | 10 | 7.5 | 7 | 3.5 | −4 | 0.02 | 0.8 | — |
| M | 9 | 5.5 | 5 | 1.5 | −4 | 0.01 | 0.5 | — |
| N | 10 | 7.5 | 1 | 3.5 | −4 | 0.03 | 0.6 | — |
| O | 10 | 7.5 | 2 | 3.5 | −4 | 0.02 | 2.1 | — |
| P | 10 | 7.5 | 3 | 3.5 | −4 | 0.01 | 0.9 | — |
| Q | 10 | 7.5 | 4 | 3.5 | −4 | 0.02 | 0.7 | — |
| R | 11 | 9.2 | 7 | 3.5 | −5.7 | 0.01 | 0.4 | — |
| S | 13 | 10.1 | 9 | 5.5 | −4.6 | 0.01 | 3.1 | — |
| T | 1 | 3.5 | 14 | 7.5 | −4 | 0.03 | 0.3 | $P_{15a} < P_{15b}$ |

| | Evaluation of Sliding Properties | | | | | |
|---|---|---|---|---|---|---|
| | Crack in Sliding Time 1000 Hours | | Crack in Sliding Time 1500 Hours | | Crack in Sliding Time 2000 Hours | |
| Sample No. | Stationary Member 5a | Movable Member 5b | Stationary Member 5a | Movable Member 5b | Stationary Member 5a | Movable Member 5b |
| A✗ | Unconfirmed | Unconfirmed | Unconfirmed | Unconfirmed | Unconfirmed | Unconfirmed |
| B✗ | Unconfirmed | Unconfirmed | Unconfirmed | Unconfirmed | Unconfirmed | Unconfirmed |
| C✗ | Unconfirmed | Confirmed | Confirmed | Confirmed | Confirmed | Confirmed |
| D | Unconfirmed | Unconfirmed | Unconfirmed | Unconfirmed | Unconfirmed | Confirmed |
| E | Unconfirmed | Unconfirmed | Unconfirmed | Unconfirmed | Unconfirmed | Unconfirmed |
| F | Unconfirmed | Unconfirmed | Confirmed | Unconfirmed | Confirmed | Confirmed |
| G | Unconfirmed | Unconfirmed | Unconfirmed | Unconfirmed | Confirmed | Confirmed |
| H | Unconfirmed | Unconfirmed | Unconfirmed | Unconfirmed | Unconfirmed | Confirmed |
| I | Unconfirmed | Unconfirmed | Unconfirmed | Unconfirmed | Confirmed | Confirmed |
| J | Unconfirmed | Unconfirmed | Unconfirmed | Confirmed | Unconfirmed | Confirmed |
| K | Unconfirmed | Confirmed | Unconfirmed | Confirmed | Unconfirmed | Confirmed |
| L | Unconfirmed | Unconfirmed | Unconfirmed | Unconfirmed | Confirmed | Unconfirmed |
| M | Unconfirmed | Unconfirmed | Unconfirmed | Unconfirmed | Unconfirmed | Unconfirmed |
| N | Unconfirmed | Unconfirmed | Unconfirmed | Confirmed | Confirmed | Confirmed |
| O | Unconfirmed | Unconfirmed | Unconfirmed | Unconfirmed | Confirmed | Confirmed |
| P | Unconfirmed | Unconfirmed | Unconfirmed | Unconfirmed | Confirmed | Unconfirmed |
| Q | Unconfirmed | Unconfirmed | Unconfirmed | Unconfirmed | Confirmed | Confirmed |
| R | Unconfirmed | Unconfirmed | Confirmed | Unconfirmed | Confirmed | Unconfirmed |
| S | Confirmed | Confirmed | Confirmed | Confirmed | Confirmed | Unconfirmed |
| T | Unconfirmed | Unconfirmed | Unconfirmed | Unconfirmed | Unconfirmed | Unconfirmed |

✗:means Sample out of the scope of this invention.

*1: As to wear depth, A to K are values of the movable member 5b, and L to S are values of the stationary member 5a.

*2: "Relationship of Number of Pores" means the relationship of the number of the pores having the circular opening in the sliding surfaces 15a, 15b.

As shown in Table 3, each of Samples Nos. A to C in which the difference of the content of graphite in the silicon carbide sintered body was less than 4% by mass had a large wear depth of the movable member 5b.

On the other hand, in Samples Nos. D to S of the present invention, the stationary member 5a and the movable member 5b are composed of the silicon carbide sintered body containing graphite, and the content of graphite in one of the stationary member 5a and the movable member 5b is at least 4% by mass greater than in the other. Therefore, the sliding surface of the one having a larger content of graphite has a high lubricant function. Hence, the coefficient of friction is as low as 0.03 or less, and it can be said that superior sliding characteristics can be maintained even in the long-term continuous use. Further in these Samples Nos. D to S of the present invention, in one of the stationary member 5a and the movable member 5b which has a lower content of graphite, the graphite has a lower hardness than the silicon carbide sintered body. Hence, the wear depth of the stationary member 5a or the movable member 5b is as small as 3.1 μm or less, and the amount of wear of their respective sliding surfaces 15a and 15b are suppressed. It can therefore be said that the replacement frequency of the members is minimized.

Especially in Samples Nos. D to J, and L to R, the content of graphite in the silicon carbide sintered body is less than 10% by mass, that is, the content of graphite having a lower hardness than the silicon carbide sintered body is sufficiently suppressed, so that the wear depth of the stationary member 5a or the movable member 5b is further smaller, namely 2.1 μm or less. It can therefore be said that the replacement frequency of the members is further decreased. Additionally, Samples Nos. D to J, and L to R have a coefficient of friction of 0.03 or less, and it can therefore be said that superior sliding characteristics are maintained.

In Samples Nos. D, E, H to J, L, M, and P to S, the mean crystal grain diameter of graphite in the silicon carbide sintered body is not less than 4 μm nor more than 43 μm. Hence, it was found that the grain growth of the silicon carbide crystal grains was facilitated and densified, and the wear depth of the stationary member 5a was further smaller, namely 1 μm or less, thereby maintaining high sealing properties.

In each of Samples Nos. D to J, and L to R, the open porosity in the sliding surfaces 15a and 15b of the stationary member 5a and the movable member 5b is not less than 0.2% nor more than 4%. It was therefore found that the wear depth of the stationary member 5a or the movable member 5b is 2.0 μm or less, and no cracks is observed even after 1000 hours from the start of sliding, thus having both sealing properties and sliding characteristics.

In Samples Nos. D, E, H, I, L, M, P, and Q obtained by combining samples in which the thermal conductivity of the silicon carbide sintered body is 157 W/(m·K) or more, and the four-point bending strength is 282 MPa or more, the coefficient of thermal shock resistance R' that is the index of the thermal shock resistance of these samples is as high as 32634 W/m or more. It was therefore found that these samples were suitable because no crack was observed even after 1500 hours from the start of sliding.

Especially, in Samples Nos. E and M obtained by combining samples in which the thermal conductivity of the silicon carbide sintered body is 175 W/(m·K) or more, the four-point bending strength is 330 MPa or more, and the coefficient of thermal shock resistance R' that is the index of the thermal shock resistance of these samples is as high as 40268 W/m or more. It was therefore found that these samples were more suitable because no crack was observed even after 2000 hours from the start of sliding.

Comparison is made between Sample No. T and Sample No. F. In Sample No. T, a large number of pores having the circular opening are dotted in the sliding surface 15b of the movable member 5b having a smaller content of graphite than the sliding surface 15a of the stationary member 5a having a larger content of graphite. Therefore, the lubricating fluid is apt to be retained in the pores having the circular opening, and is gradually supplied between the sliding surfaces 15a and 15b, thereby maintaining the sliding characteristics over the long term. It can also be said that the stationary ring 5a is less susceptible to wear, and the replacement frequency of the sliding component can be decreased than Sample No. F in which a large number of pores are dotted in the sliding surface 15a of the stationary member 5a having a large content of graphite.

EXPLANATION OF REFERENCE NUMERALS

1: graphite
2: pores
5: mechanical seal ring
5a: stationary member
5b: movable member
16: faucet valve
17: stationary valve body
18: movable valve body
20: roller bearing

The invention claimed is:

1. A sliding component, comprising:
a stationary member; and
a movable member sliding on the stationary member in contact with the stationary member, wherein
the stationary member and the movable member are respectively composed of a silicon carbide sintered body containing graphite, and
the content of the graphite in one of the stationary member and the movable member is at least 4% by mass greater than in the other.

2. The sliding component according to claim 1, wherein the content of the graphite in each of the stationary member and the movable member is less than 10% by mass.

3. The sliding component according to claim 1, a mean crystal grain diameter of the graphite in each of the stationary member and the movable member is not less than 4 μm nor more than 43 μm.

4. The sliding component according to claim 1, wherein the body each of sliding surfaces of the stationary member and the movable member where both come into contact with each other has an open porosity of not less than 0.2% nor more than 4%.

5. The sliding component according to claim 1, wherein each of the stationary member and the movable member has a thermal conductivity of 157 W/(m·k) or more, and a four-point bending strength of 282 MPa or more.

6. The sliding component according to claim 1, wherein a larger number of pores having a circular opening are dotted in a sliding surface of one of the stationary member and the movable member having a low content of the graphite than in a sliding surface of the other having a high content of the graphite.

7. A mechanical seal ring comprising the sliding component according to claim 1.

8. A mechanical seal comprising the mechanical seal ring according to claim 7.

9. A faucet valve comprising the sliding component according to claim 1.

10. A rolling support device comprising the sliding component according to claim 1.

* * * * *